(12) United States Patent
Chen

(10) Patent No.: US 12,419,796 B2
(45) Date of Patent: Sep. 23, 2025

(54) MEDICAL REHABILITATION CHAIR WITH SITTING AND RECLINING ANGLE ADJUSTMENT MECHANISM

(71) Applicant: Wen-Chun Chen, Taichung (TW)

(72) Inventor: Wen-Chun Chen, Taichung (TW)

(*) Notice: Subject to any disclaimer, the term of this patent is extended or adjusted under 35 U.S.C. 154(b) by 301 days.

(21) Appl. No.: 18/453,815

(22) Filed: Aug. 22, 2023

(65) Prior Publication Data

US 2025/0064656 A1 Feb. 27, 2025

(51) Int. Cl.
*A61G 5/12* (2006.01)
*A61G 5/10* (2006.01)
*B60B 33/00* (2006.01)

(52) U.S. Cl.
CPC .............. *A61G 5/128* (2016.11); *A61G 5/104* (2013.01); *A61G 5/1067* (2013.01); *A61G 5/1081* (2016.11); *A61G 5/125* (2016.11); *A61G 5/1045* (2016.11); *A61G 5/1048* (2016.11); *B60B 33/006* (2013.01)

(58) Field of Classification Search
CPC ...... A61G 5/128; A61G 5/125; A61G 5/1081; A61G 5/104; A61G 5/1067; A61G 5/1048; A61G 5/1045; B60B 33/006
See application file for complete search history.

(56) References Cited

U.S. PATENT DOCUMENTS

| | | | | |
|---|---|---|---|---|
| 2022/0047438 | A1* | 2/2022 | Tripepi | A61G 5/1045 |
| 2025/0064211 | A1* | 2/2025 | Chen | A61G 5/14 |
| 2025/0064656 | A1* | 2/2025 | Chen | A61G 5/00 |

FOREIGN PATENT DOCUMENTS

| | | | | |
|---|---|---|---|---|
| CN | 109907894 A | * | 6/2019 | |
| CN | 210644369 U | * | 6/2020 | |
| CN | 114392065 A | * | 4/2022 | A61G 5/00 |
| CN | 116636980 A | * | 8/2023 | A61G 5/045 |
| CN | 117582579 A | * | 2/2024 | A61M 5/1415 |
| CN | 118402913 A | * | 7/2024 | A61F 7/00 |
| CN | 119564411 A | * | 3/2025 | A61H 1/0285 |

* cited by examiner

*Primary Examiner* — James A Shriver, II
(74) *Attorney, Agent, or Firm* — LANWAY IPR SERVICES; Chun-Ming Shih

(57) ABSTRACT

A medical rehabilitation chair includes a main frame, multiple castor devices mounted on the bottom of the main frame, and two armrest boards mounted on two sides of the main frame. A telescopic damping driver, a seat frame assembly, a backrest frame assembly, a leg support assembly, a lifting mechanism, and a foot support assembly are assembled on the main frame. The seat frame assembly has a front section connecting the leg support assembly and a rear section connecting the backrest frame assembly. The telescopic damping driver drives the backrest frame assembly, the seat frame assembly, and the leg support assembly, to produce different swinging angles. The lifting mechanism drives the seat frame assembly to lift or lower. The foot support assembly is movable in a horizontal direction to protrude from the front section of the main frame.

12 Claims, 19 Drawing Sheets

MEDICAL REHABILITATION CHAIR WITH SITTING AND RECLINING ANGLE ADJUSTMENT MECHANISM

BACKGROUND OF THE INVENTION

Field of the Invention

The present invention relates to a chair and, more particularly, to a medical rehabilitation chair.

Description of the Related Art

A conventional medical chair with an angle adjustment function usually comprises a main body including a seat frame. A footrest rack is pivotally connected with a front section of the seat frame. A backrest frame is pivotally connected with a rear section of the seat frame. At least one rod protrudes from a back face of the backrest frame and is pivotally connected with a first end of a backrest link which has a second end pivotally connected with a branch rod which protrudes from a chair frame rotating rod. A branch lever protrudes from the chair frame rotating rod and is pivotally connected with a first end of a footrest link which has a second end pivotally connected with a protruding rod of a back face of the footrest rack. A cushioning member has a first end pivotally connected with the main body and a second end pivotally connected with a ear protruding from the chair frame rotating rod. However, the conventional medical chair has a too simple structure and has a low price, so that the profit is poor.

BRIEF SUMMARY OF THE INVENTION

The primary objective of the present invention is to provide a medical rehabilitation chair with a sitting and reclining (or lying) angle adjustment mechanism.

In accordance with the present invention, there is provided a medical rehabilitation chair comprising a main frame, multiple castor devices mounted on the bottom of the main frame, and two armrest boards mounted on two opposite sides of the main frame. A telescopic damping driver, a seat frame assembly, a backrest frame assembly, a leg support assembly, a lifting mechanism, and a foot support assembly are assembled on the main frame and located between the two armrest boards. The seat frame assembly has a front section connected with the leg support assembly and a rear section connected with the backrest frame assembly. The telescopic damping driver connects and drives the backrest frame assembly, the seat frame assembly, and the leg support assembly, to produce different swinging angles. The lifting mechanism connects and drives the seat frame assembly to lift or lower. The foot support assembly is mounted on the bottom of the main frame and is movable in a horizontal direction to protrude from the front section of the main frame. Thus, the user operates the medical rehabilitation chair to adjust the sitting, reclining and lying postures of the upper body, and to adjust the angle and height of the legs.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
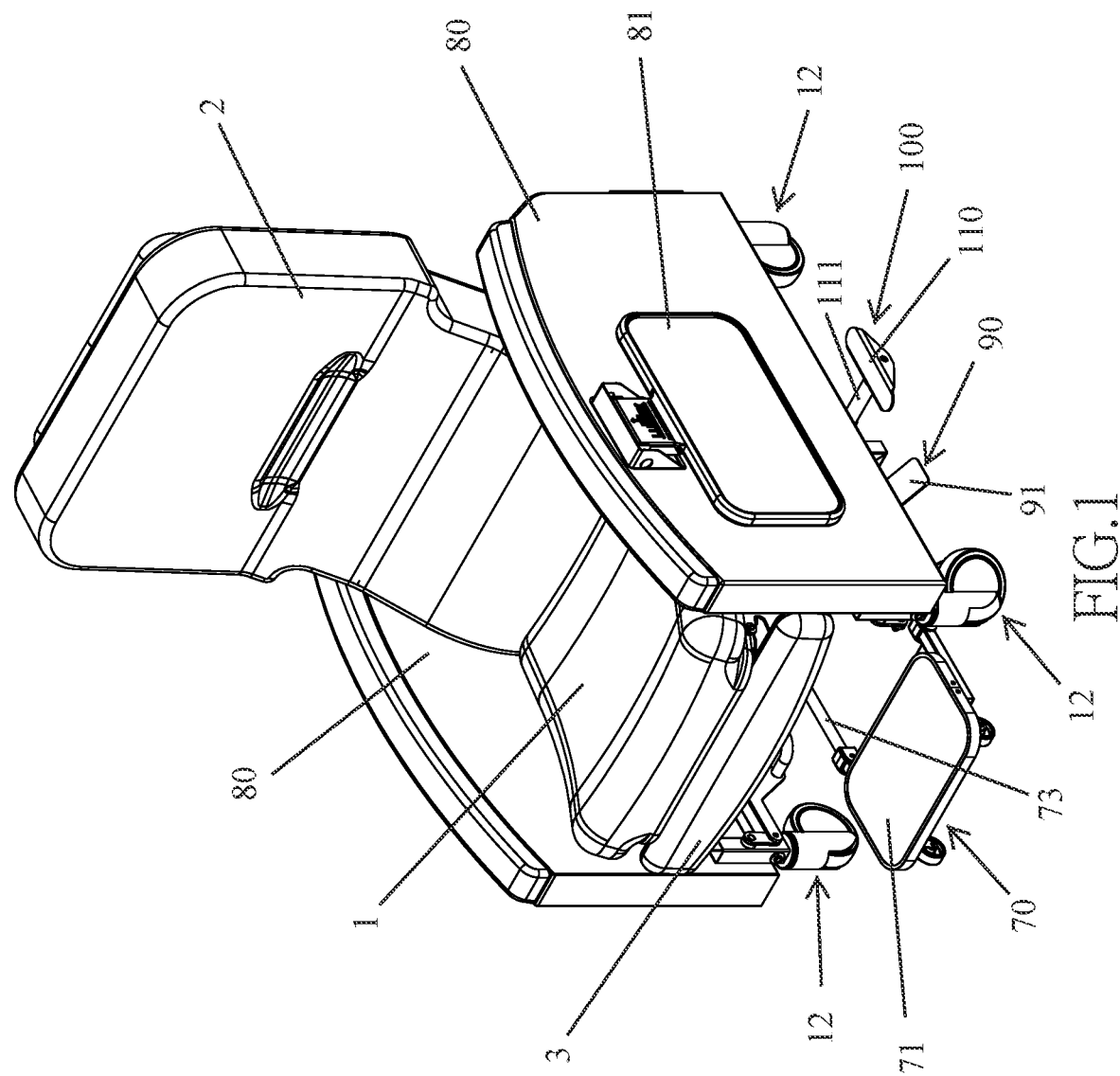
FIG. 1 is a perspective view of a medical rehabilitation chair in accordance with the preferred embodiment of the present invention.
Figure 2:
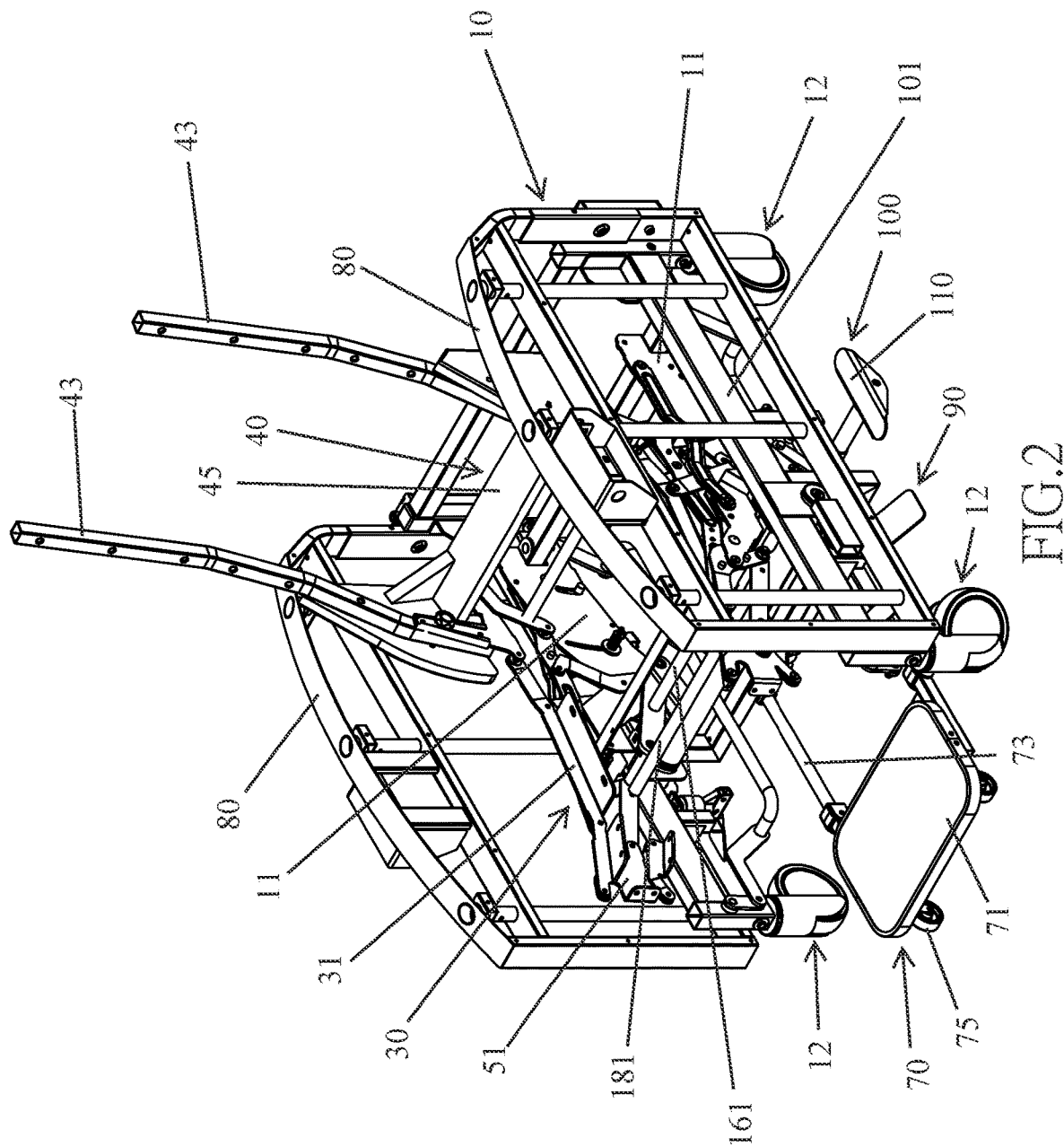
FIG. 2 is a perspective view of a skeleton (sitting mode) of the medical rehabilitation chair in accordance with the preferred embodiment of the present invention.
Figure 3:
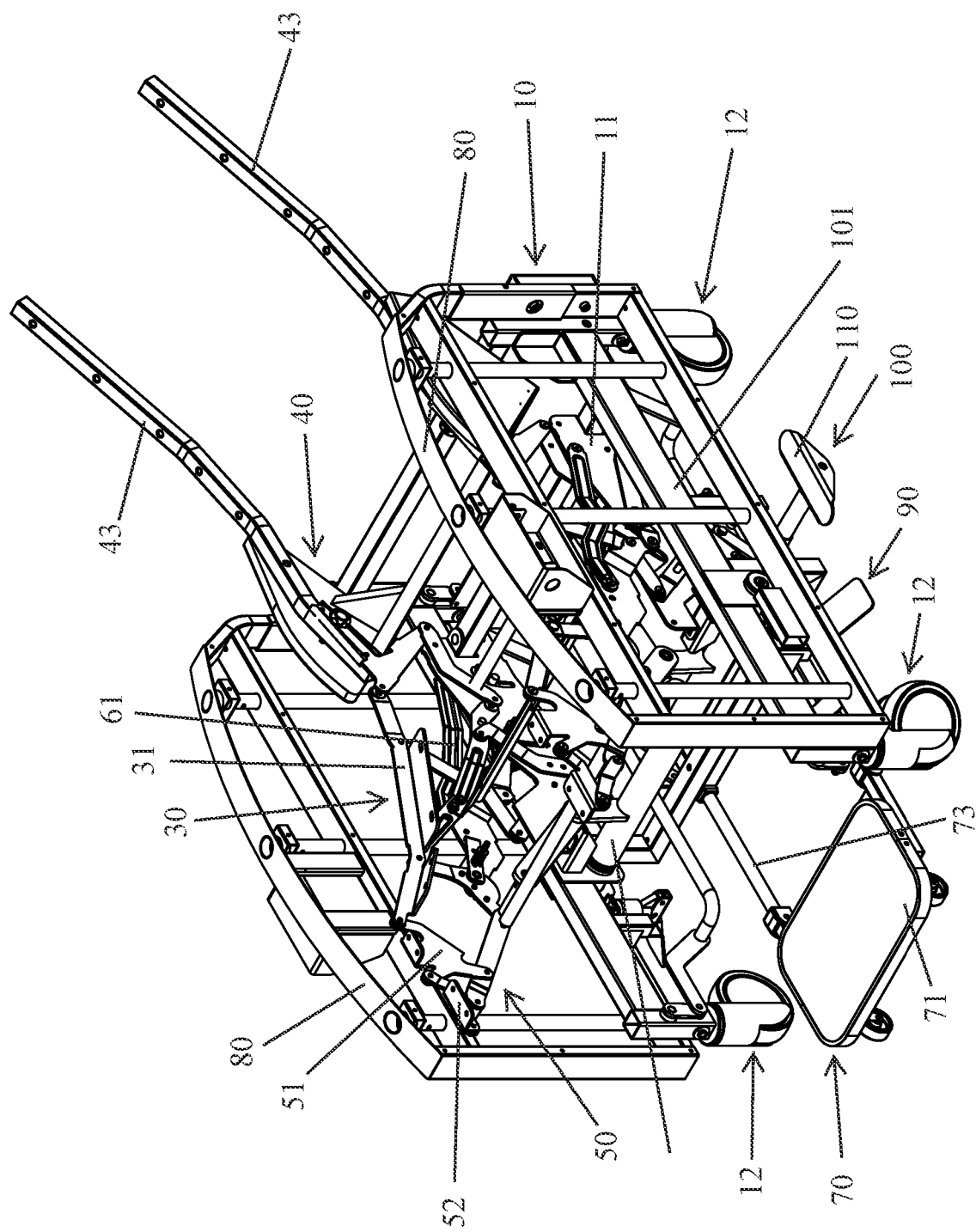
FIG. 3 is a perspective view of the skeleton (lying or reclining mode) of the medical rehabilitation chair in accordance with the preferred embodiment of the present invention.
Figure 4:
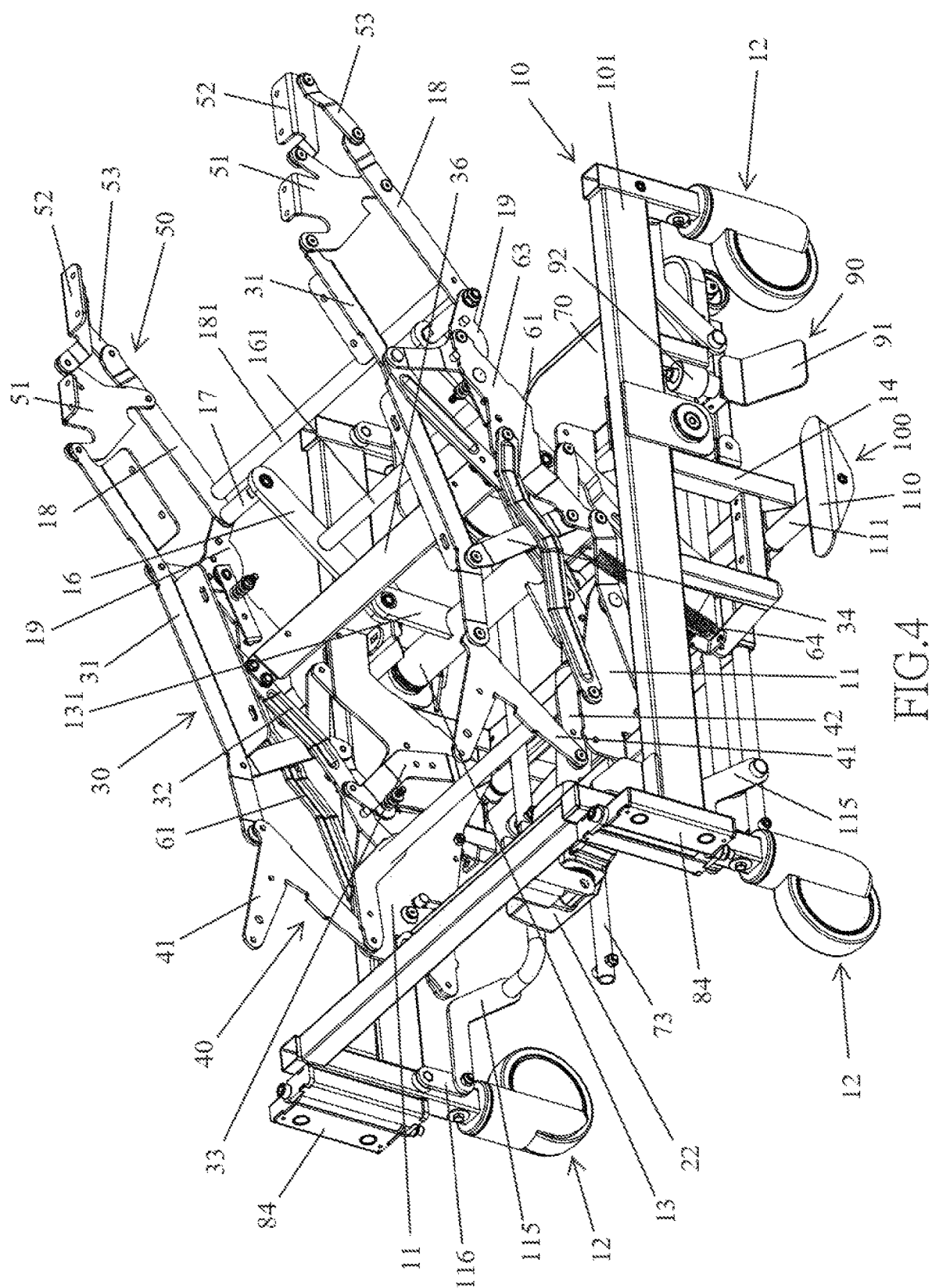
FIG. 4 is a partial perspective view of the medical rehabilitation chair in accordance with the preferred embodiment of the present invention.
Figure 5:
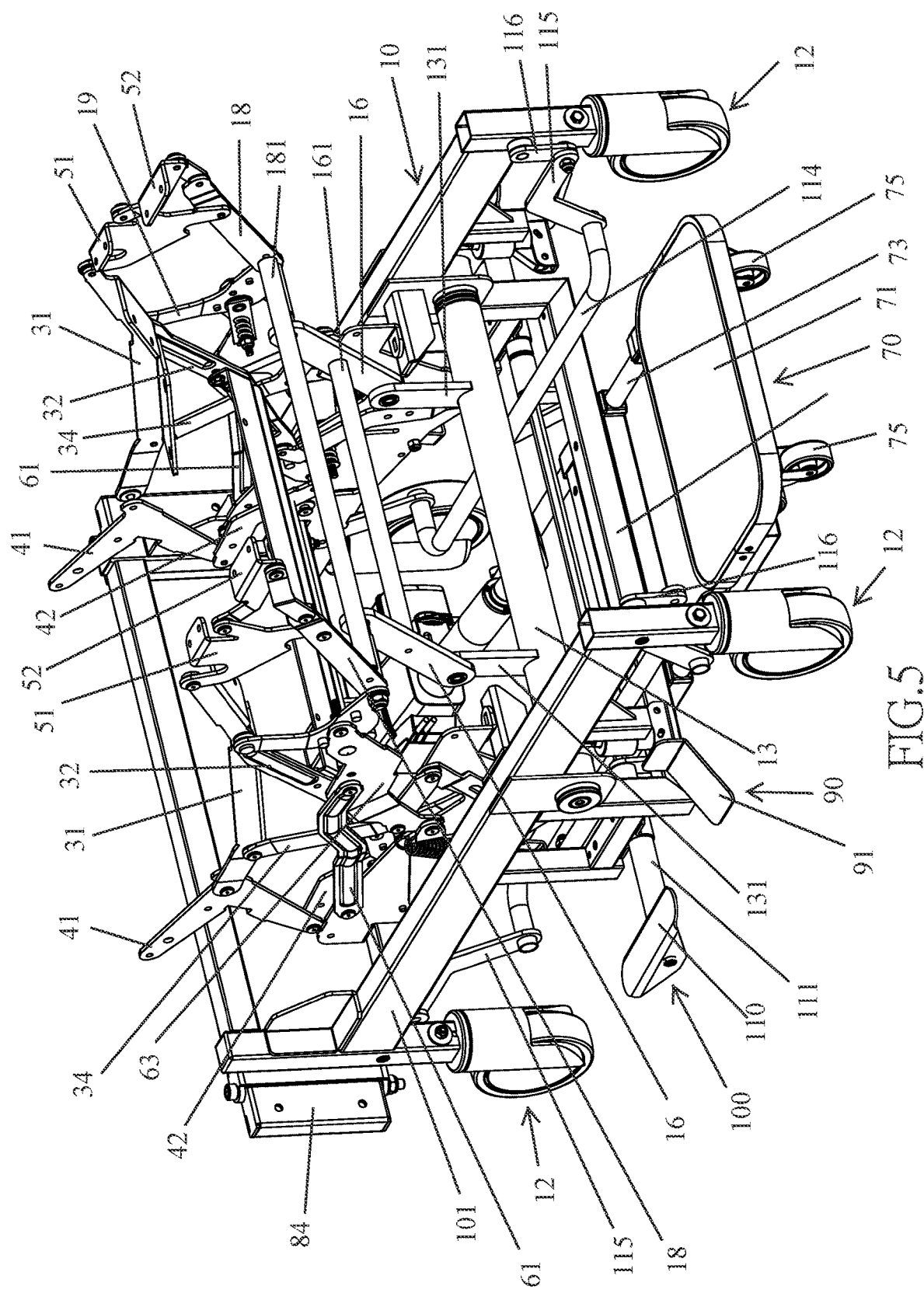
FIG. 5 is another partial perspective view of the medical rehabilitation chair in accordance with the preferred embodiment of the present invention.
Figure 6:
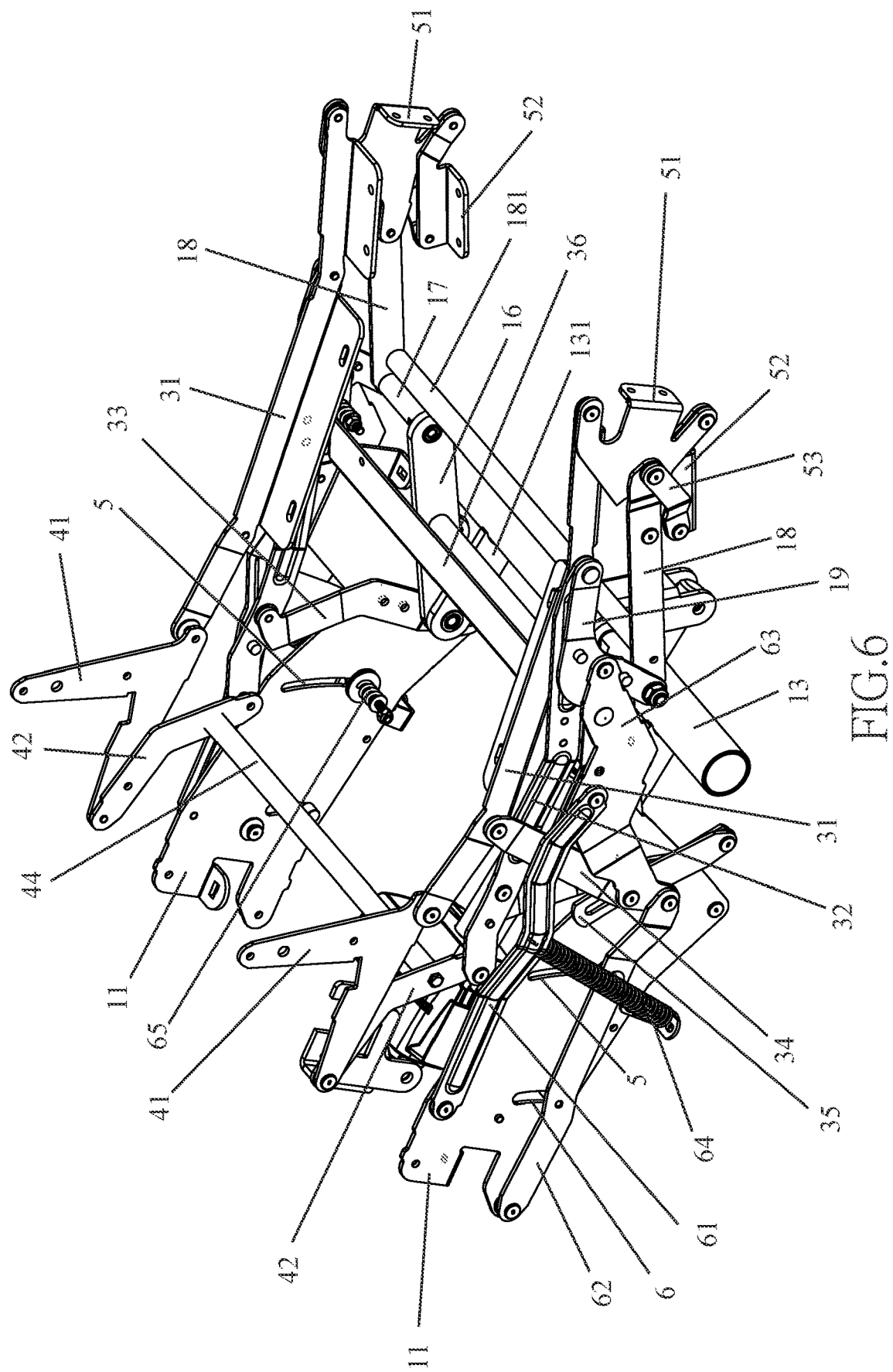
FIG. 6 is another partial perspective view of the medical rehabilitation chair in accordance with the preferred embodiment of the present invention.
Figure 7:
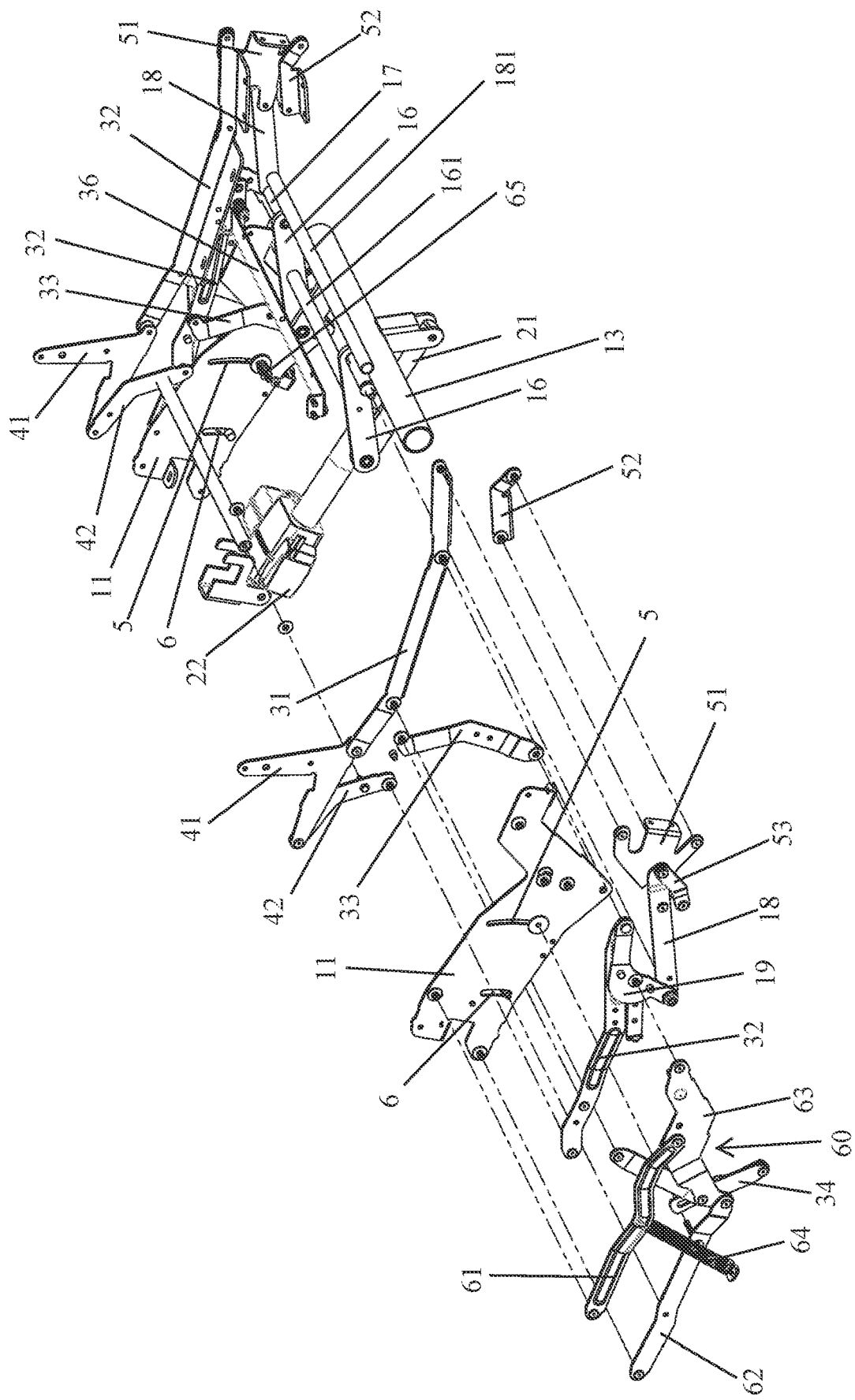
FIG. 7 is an exploded perspective view of the medical rehabilitation chair as shown in FIG. 6.

Referring to FIGS. 1-19, a medical rehabilitation chair in accordance with the preferred embodiment of the present invention comprises a main frame 10, a telescopic (or retractable) damping driver 20, a seat frame assembly 30, a backrest frame assembly 40, a leg support assembly 50, a lifting mechanism 60, a foot support assembly 70, two armrest boards 80, two armrest board positioning devices 90, and two castor positioning devices 100.

The main frame 10 is placed on the ground. The main frame 10 includes two side racks 101, two lifting guide plates 11, a main rotation rod 13, a first fixed bottom bracket 14, a second fixed bottom bracket 15, two first swinging levers 16, two first fixed members 17, two second fixed members 18, and two second swinging levers 19. The two side racks 101 are parallel with each other. Each of the two side racks 101 has a front section and a rear section each provided with a castor device 12. Each of the two lifting guide plates 11 is secured to a mediate section of an inner side of one of the two side racks 101. Each of the two lifting guide plates 11 is formed with a first elongate slot 5 and a second elongate slot 6. The main rotation rod 13 is pivotally mounted between the two side racks 101. The first fixed bottom bracket 14 is secured between the two side racks 101. The second fixed bottom bracket 15 is secured between the two side racks 101. Each of the two first swinging levers 16 has a first end radially and pivotally connected with the main rotation rod 13. Each of the two first fixed members 17 is a rod and has a first end axially and pivotally connected with a second end of one of the two first swinging levers 16. Each of the two second fixed members 18 is a lever (or link) and has a first end securely connected with a second end of one of the two first fixed members 17. Each of the two second swinging levers 19 has a first end pivotally connected with the second end of one of the two first fixed members 17.

The telescopic damping driver 20 has a first end pivotally connected with the second fixed bottom bracket 15 and a second end pivotally connected with the main rotation rod 13. The telescopic damping driver 20 drives and rotates the main rotation rod 13.

The seat frame assembly 30 includes two seat frames (or racks) 31, two first driven levers 32, two third swinging levers 33, two first linking members 34, and two second linking members 35. The two seat frames 31 are parallel with each other. Each of the two first driven levers 32 has a front section pivotally connected with a mediate section of one of the two seat frames 31 and a second end of one of the two second swinging levers 19 of the main frame 10. Each of the two third swinging levers 33 has a first end pivotally connected with a rear section of one of the two first driven levers 32. Each of the two third swinging levers 33 has a second end pivotally connected with an inner side of one of the two lifting guide plates 11. Each of the two first linking members 34 has a first end pivotally connected with a rear section of one of the two seat frames 31. Each of the two second linking members 35 has a first end pivotally connected with a second end of one of the two first linking members 34. Each of the second linking members 35 has a second end pivotally connected with an outer side of one of the two lifting guide plates 11.

The backrest frame assembly 40 is pivotally connected with a rear section of the seat frame assembly 30. Different swinging angles are defined between the backrest frame assembly 40 and the seat frame assembly 30. The backrest frame assembly 40 includes two connecting members 41, two fourth swinging levers 42, and two backrest frames (or racks) 43. Each of the two connecting members 41 has a first end pivotally connected with a rear section of one of the two seat frames 31. Each of the two fourth swinging levers 42 has a first end pivotally connected with a second end of one of the two connecting members 41. Each of the two fourth swinging levers 42 has a second end pivotally connected with the rear section of one of the two first driven levers 32 of the seat frame assembly 30. Each of the two backrest frames 43 is secured on a top of one of the two connecting members 41.

Figure 10:
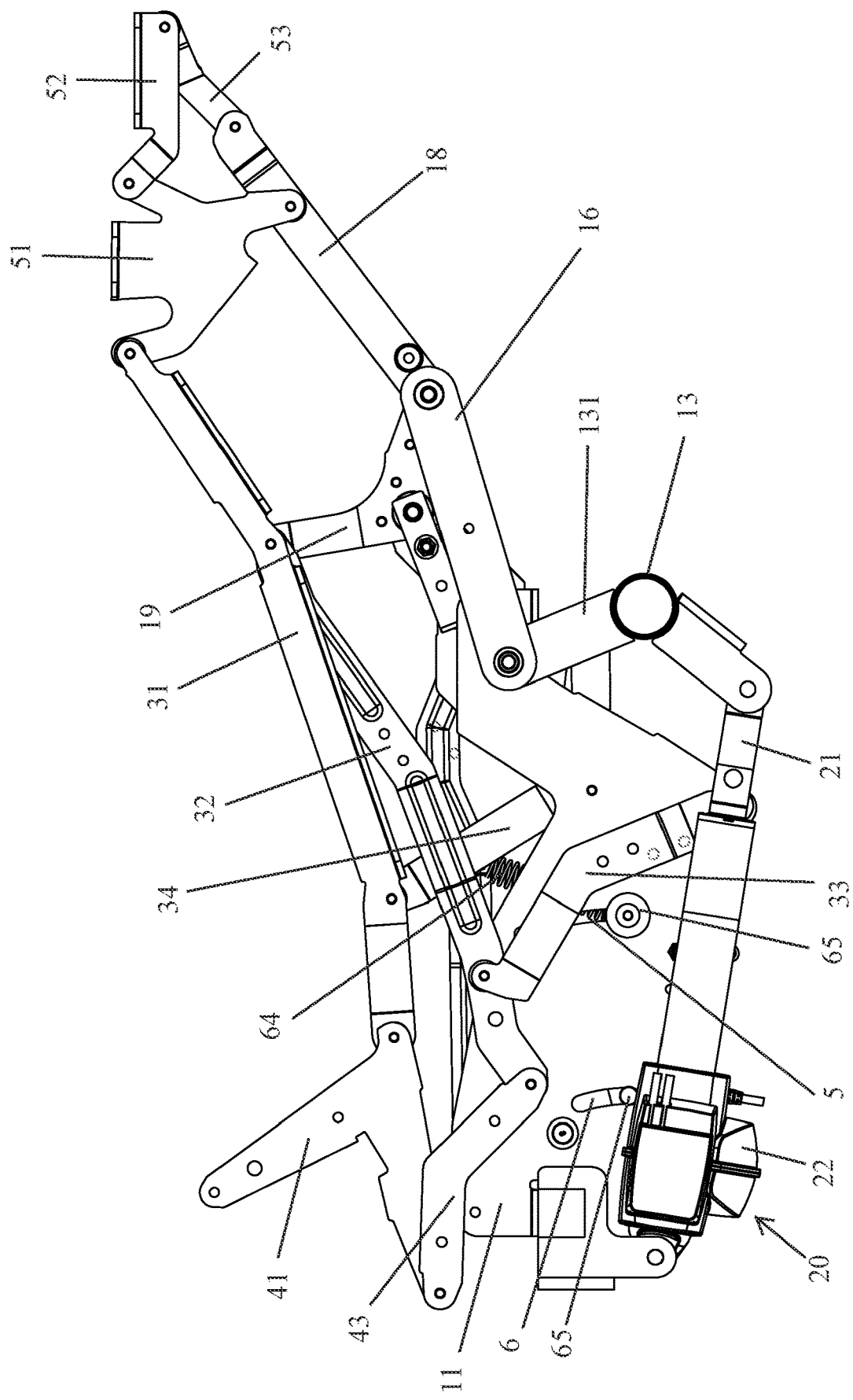
FIG. 10 is a schematic operational view of the medical rehabilitation chair as shown in FIG. 9.

The leg support assembly 50 is pivotally connected with a front section of the seat frame assembly 30. Different swinging angles are defined between the leg support assembly 50 and the seat frame assembly 30. The leg support assembly 50 includes two first swing members 51, two driven members 52, and two second swing members 53 as shown in FIG. 10. Each of the two first swing members 51 is pivotally connected with a front section of one of the two seat frames 31 and a second end of one of the two second fixed members 18 of the main frame 10. Each of the two driven members 52 has a first end pivotally connected with one of the two first swing members 51. Each of the two second swing members 53 has a first end pivotally connected with the second end of one of the two second fixed members 18 of the main frame 10. Each of the two second swing members 53 has a second end pivotally connected with a second end of one of the two driven members 52.

Figure 9:
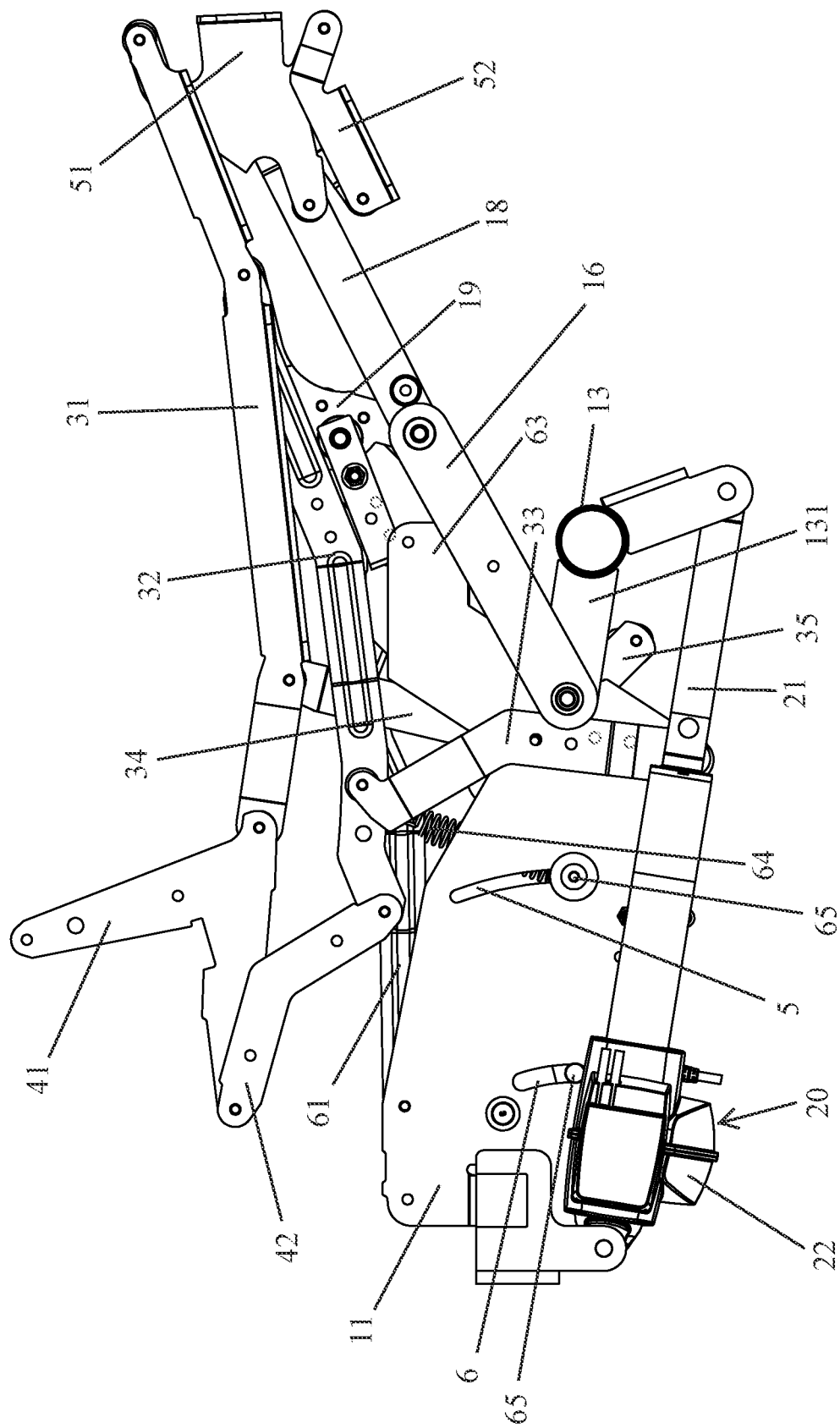
FIG. 9 is a partial inner side view of the medical rehabilitation chair in accordance with the preferred embodiment of the present invention.

The lifting mechanism 60 includes two first outer swinging levers 61, two second outer swinging levers 62, two linking elements 63, and two springs 64. Each of the two first outer swinging levers 61 has a first end pivotally connected with an upper edge of the outer side of one of the two lifting guide plates 11. Each of the two second outer swinging levers 62 has a first end pivotally connected with a lower edge of the outer side of one of the two lifting guide plates 11. Each of the two second outer swinging levers 62 has an inner side provided with two guide posts 65 movably mounted in the first elongate slot 5 and the second elongate slot 6 of one of the two lifting guide plates 11 as shown in FIG. 9. Each of the two linking elements 63 has a mediate section pivotally connected with a second end of one of the two first outer swinging levers 61. Each of the two linking elements 63 has a front section pivotally connected with one of the two second swinging levers 19 of the main frame 10. Each of the two linking elements 63 has a rear section pivotally connected with a second end of one of the two second outer swinging levers 62. Each of the two linking elements 63 is pivotally connected with one of the two first linking members 34 of the seat frame assembly 30. Each of the two springs 64 has a first end secured to a mediate section of one of the two first outer swinging levers 61 and a second end secured to a lower edge of one of the two lifting guide plates 11.

The foot support assembly 70 is mounted on a bottom of the main frame 10. The foot support assembly 70 is movable in a horizontal direction to protrude from a front section of the main frame 10.

The two armrest boards 80 are mounted on two opposite sides of the main frame 10. Each of the two armrest boards 80 has an end pivotally connected with one of the two side racks 101 of the main frame 10 so that each of the two armrest boards 80 is pivoted horizontally and outward.

Each of the two armrest board positioning devices 90 is mounted on one of the two side racks 101 to position one of the two armrest boards 80.

The two castor positioning devices 100 are mounted on two ends of the first fixed bottom bracket 14 of the main frame 10 and located under the two side racks 101 to link and rotate the castor devices 12 of the two side racks 101 respectively.

In the preferred embodiment of the present invention, the main rotation rod 13 is radially provided with two pivot ears 131. Each of the two pivot ears 131 is pivotally connected with the first end of one of the two first swinging levers 16.

In the preferred embodiment of the present invention, the telescopic damping driver 20 includes a telescopically arranged cylinder unit 21 and a motor device 22 connecting and driving the cylinder unit 21. The motor device 22 is pivotally connected with the second fixed bottom bracket 15. The telescopically arranged cylinder unit 21 has an end pivotally connected with the main rotation rod 13 to drive and rotate the main rotation rod 13.

In the preferred embodiment of the present invention, the foot support assembly 70 includes a footrest 71, a bottom rack 72, at least one slide rod 73, at least one hollow mounting sleeve 74, and multiple rollers 75. The bottom rack 72 and the rollers 75 are mounted on a bottom of the footrest 71. The at least one slide rod 73 is secured on a side of the bottom rack 72. The at least one hollow mounting sleeve 74 is secured to the first fixed bottom bracket 14. The at least one slide rod 73 extends through and slides forward and backward in the at least one hollow mounting sleeve 74.

In the preferred embodiment of the present invention, each of the two armrest boards 80 includes a hinge device 84 pivotally connected with one of the two side racks 101.

In the preferred embodiment of the present invention, each of the two armrest boards 80 has an outer side pivotally connected with a placement board 81. The placement board 81 is folded downward and parallel with each of the two armrest boards 80 or expanded upward and perpendicular to each of the two armrest boards 80.

In the preferred embodiment of the present invention, each of the two armrest boards 80 has an inner side provided with a positioning member 82 defining a positioning hole 83. Each of the two armrest board positioning devices 90 includes a control board 91, a hollow sliding tube 92, and a positioning pin 93. The positioning pin 93 is mounted in the sliding tube 92. The control board 91 is connected with the positioning pin 93 and controls upward and downward movement of the positioning pin 93, so that the positioning pin 93 is moved upward and inserted into the positioning hole 83 of the positioning member 82.

In the preferred embodiment of the present invention, each of the two castor positioning devices 100 includes a swing pedal 110, a control crossbar 111 having a first end axially and securely connected with the swing pedal 110, a fifth swinging lever 112 having a first end securely connected with a second end of the control crossbar 111, a second driven lever 113 having a first end pivotally connected with a second end of the fifth swinging lever 112, a rocking bar 114 pivotally connected with a second end of the second driven lever 113 and having two ends, two third driven levers 115 each having a first end pivotally connected with one of the two ends of the rocking bar 114, and two fourth driven levers 116 each having a first end pivotally connected with a second end of one of the two third driven levers 115. Each of the two fourth driven levers 116 has a second end controlling rotation of one of the castor devices 12 of each of the two side racks 101.

In the preferred embodiment of the present invention, a linking bar 117 is connected between the two castor positioning devices 100 to simultaneously link and control rotation of the castor devices 12 of the two side racks 101.

In the preferred embodiment of the present invention, the medical rehabilitation chair further comprises a seat cushion 1 secured on the two seat frames 31.

In the preferred embodiment of the present invention, the medical rehabilitation chair further comprises a backrest cushion 2 secured on the two backrest frames 43.

In the preferred embodiment of the present invention, the medical rehabilitation chair further comprises a first leg support cushion 3 secured on the two first swing members 51.

In the preferred embodiment of the present invention, the medical rehabilitation chair further comprises a second leg support cushion secured on the two driven members 52.

In the preferred embodiment of the present invention, the main frame 10 further includes two first synchronous connecting rod 161 securely connected between the two first swinging levers 16, and two second synchronous connecting rod 181 securely connected between the two second fixed members 18.

In the preferred embodiment of the present invention, the seat frame assembly 30 further includes two synchronous connecting lever 36 securely connected between the two first driven levers 32.

In the preferred embodiment of the present invention, the backrest frame assembly 40 further includes a support plate 45 (in FIG. 2) mounted on the tops of the two connecting members 41, and a synchronous connecting rod 44 (in FIG. 6) securely connected between the two fourth swinging levers 42.

Figure 8:
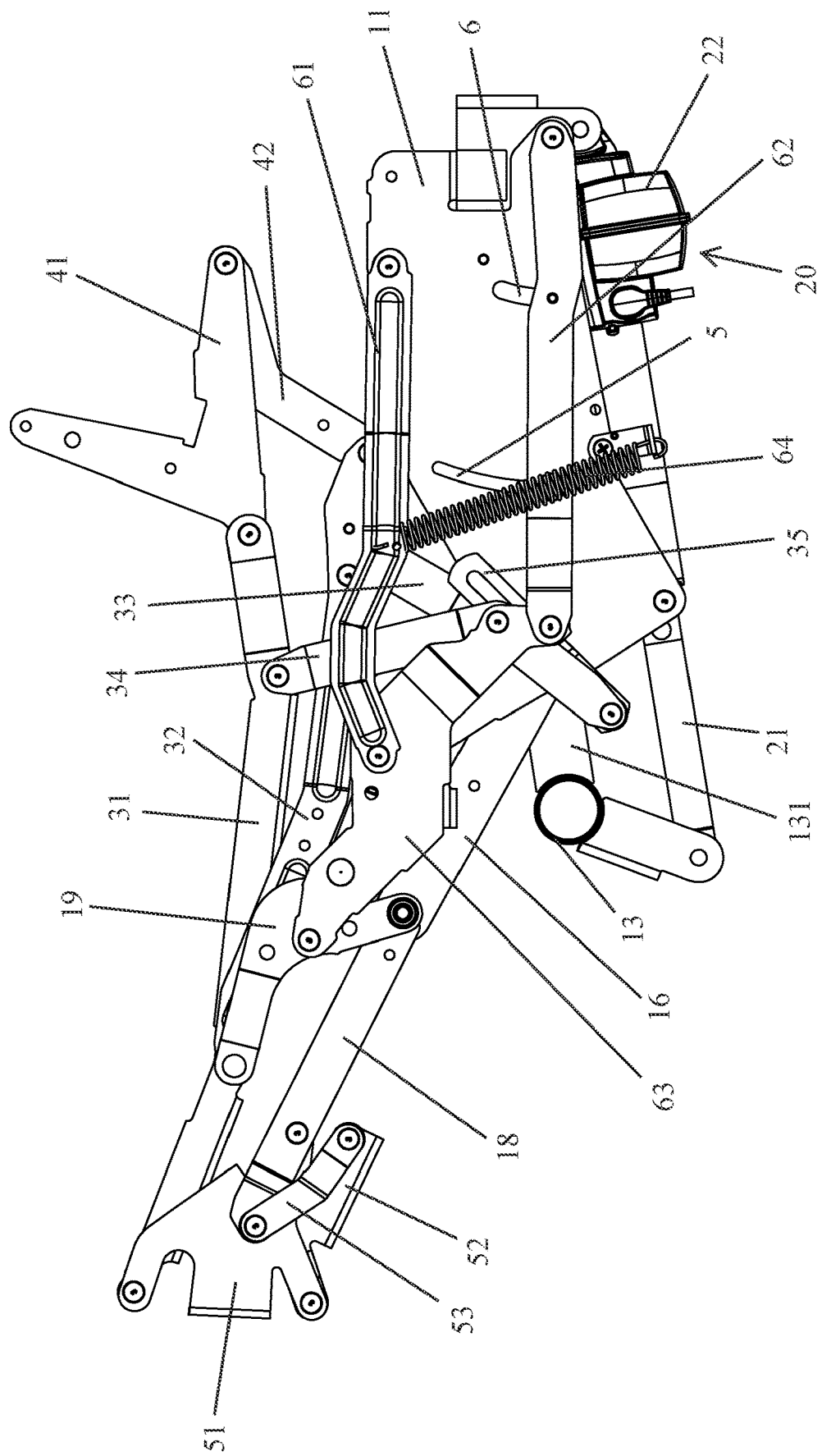
FIG. 8 is a partial outer side view of the medical rehabilitation chair in accordance with the preferred embodiment of the present invention.

In operation, referring to FIGS. 8 and 9, when the user is disposed at a sitting state, the medical rehabilitation chair is disposed at a normal state. A vertical angle is defined between the seat frame assembly 30 (or the seat cushion 1) and the backrest frame assembly 40 (or the backrest cushion 2), and between the seat frame assembly 30 (or the seat cushion 1) and the two first swing members 51 (or the first leg support cushion 3) of the leg support assembly 50. In addition, the two driven members 52 (or the second leg support cushion) of the leg support assembly 50 are folded inward and disposed under the seat frame assembly 30 (or the seat cushion 1).

Figure 11:
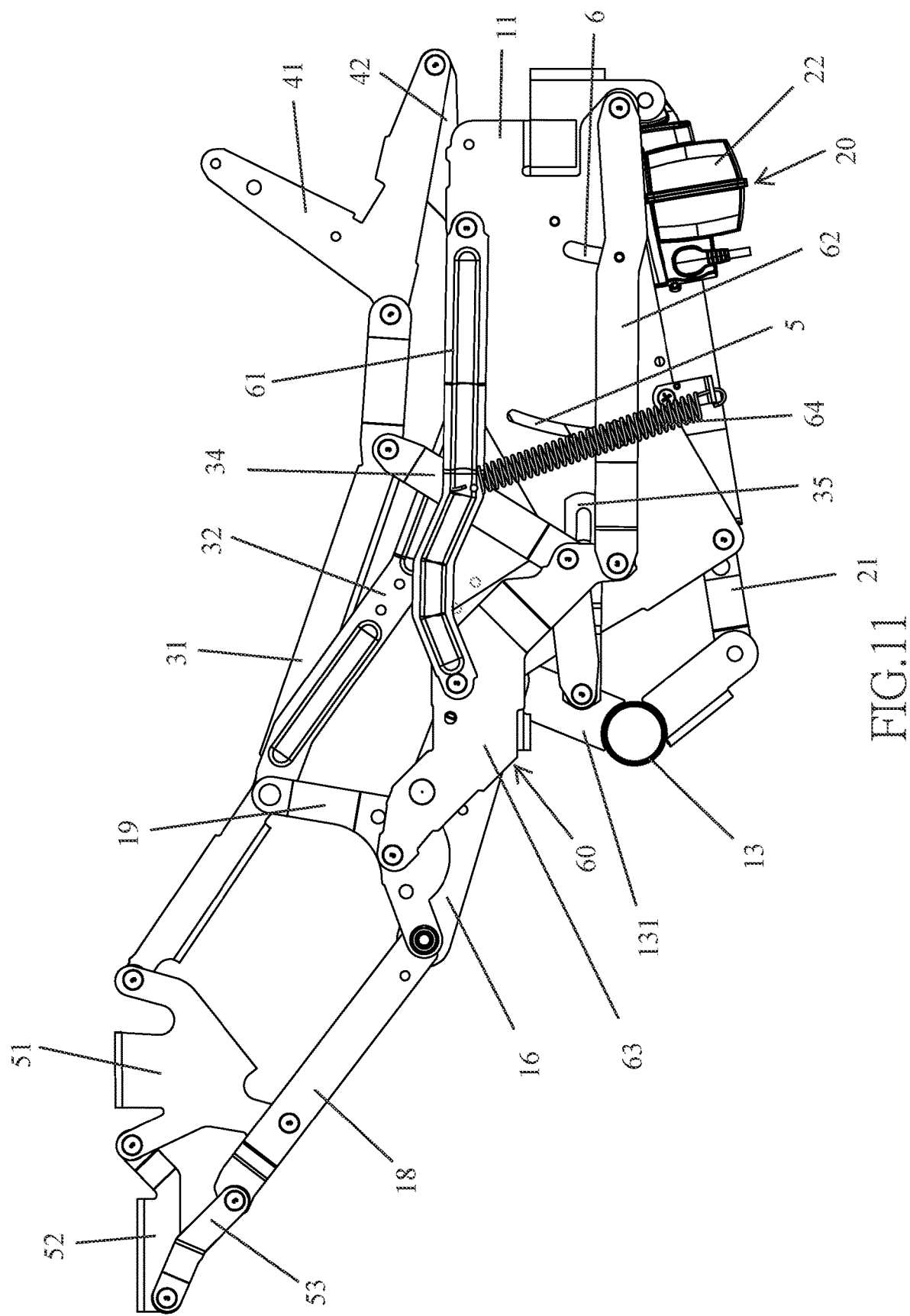
FIG. 11 is a schematic operational view of the medical rehabilitation chair as shown in FIG. 8.

As shown in FIGS. 10 and 11, when the user is disposed at a lying or reclining state, the telescopically arranged cylinder unit 21 of the telescopic damping driver 20 drives and rotates the main rotation rod 13 which drives and moves the two first swinging levers 16 which drive and push the two second fixed members 18. At the same time, the two first swinging levers 16 drive the two second swinging levers 19 to swing so that the seat frame assembly 30 (or the seat cushion 1) is moved backward. In such a manner, the two first swing members 51 (or the first leg support cushion 3) and the two driven members 52 (or the second leg support cushion) are rotated and swing upward until the two second fixed members 18 are in line with the two second swing members 53. Thus, the two first swing members 51 (or the first leg support cushion 3) and the two driven members 52 (or the second leg support cushion) are expanded.

Figure 12:
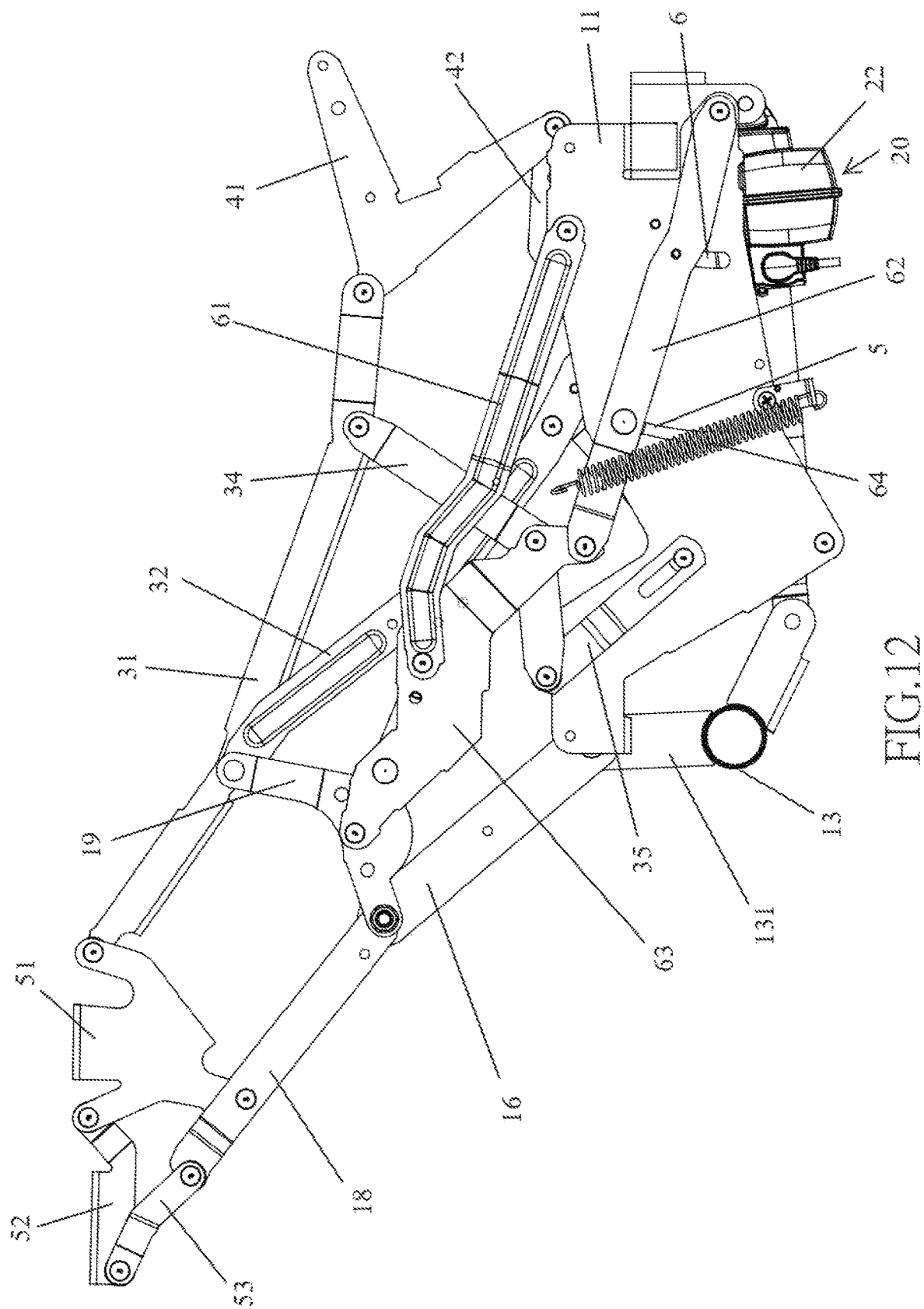
FIG. 12 is a schematic operational view of the medical rehabilitation chair as shown in FIG. 11.
Figure 13:
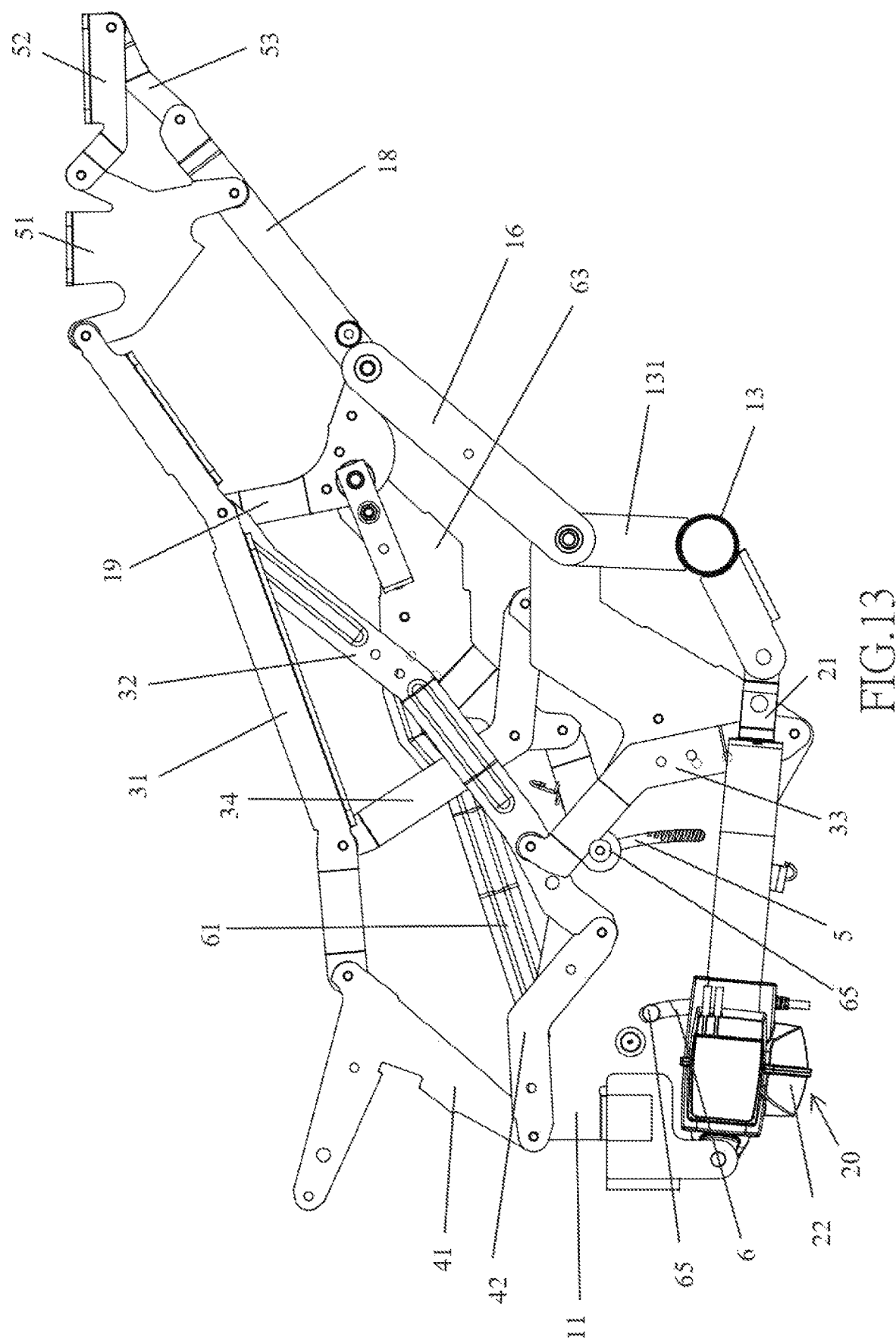
FIG. 13 is a schematic operational view of the medical rehabilitation chair as shown in FIG. 10.

As shown in FIGS. 12 and 13, when the telescopically arranged cylinder unit 21 of the telescopic damping driver 20 further drives and rotates the main rotation rod 13, the two pivot ears 131 of the main rotation rod 13 successively push the two first swinging levers 16 upward, so that the seat frame assembly 30 (or the seat cushion 1), the two first swing members 51 (or the first leg support cushion 3), and the two driven members 52 (or the second leg support cushion) are lifted simultaneously. At the same time, the two first outer swinging levers 61 and the two second outer swinging levers 62 swing relative to the two lifting guide plates 11, and the two guide posts 65 of each of the two second outer swinging levers 62 are moved upward in the first elongate slot 5 and the second elongate slot 6 of one of the two lifting guide plates 11. When the seat frame assembly 30 (or the seat cushion 1) is lifted, each of the two connecting members 41 connected with one of the two seat frames 31 swings backward, so that the backrest frame assembly 40 (or the backrest cushion 2) is further inclined backward. Thus, the backrest frame assembly 40 (or the backrest cushion 2), the seat frame assembly 30 (or the seat cushion 1), the two first swing members 51 (or the first leg support cushion 3), and the two driven members 52 (or the second leg support cushion) are adjusted integrally to present a reclining or lying state.

On the contrary, when the telescopically arranged cylinder unit 21 of the telescopic damping driver 20 drives and rotates the main rotation rod 13 reversely, the seat frame assembly 30 (or the seat cushion 1) is lowered, so that the medical rehabilitation chair is returned to the normal state, and the user is disposed at the sitting state.

Figure 16:
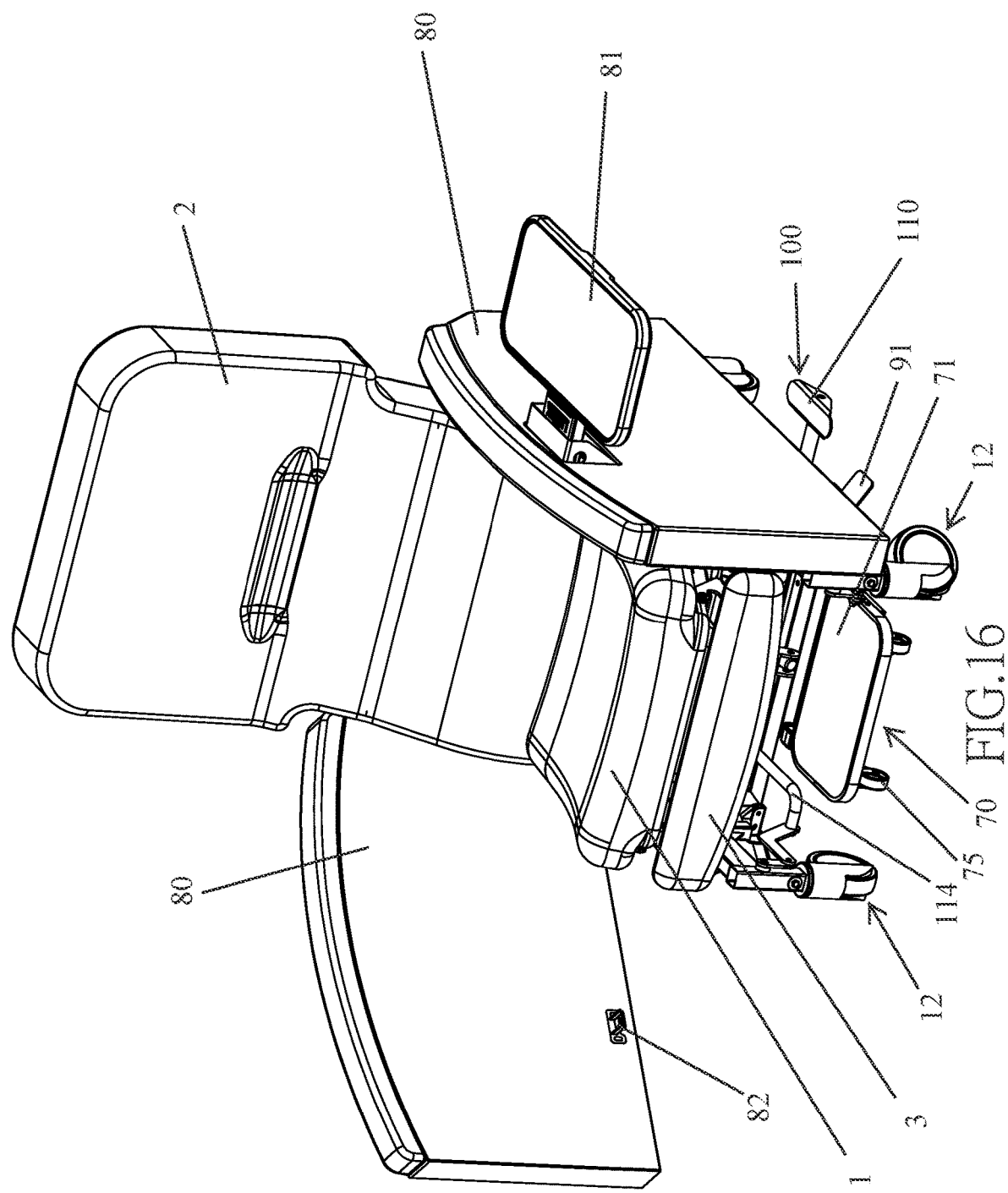
FIG. 16 is a schematic operational view of the medical rehabilitation chair as shown in FIG. 1.
Figure 17:
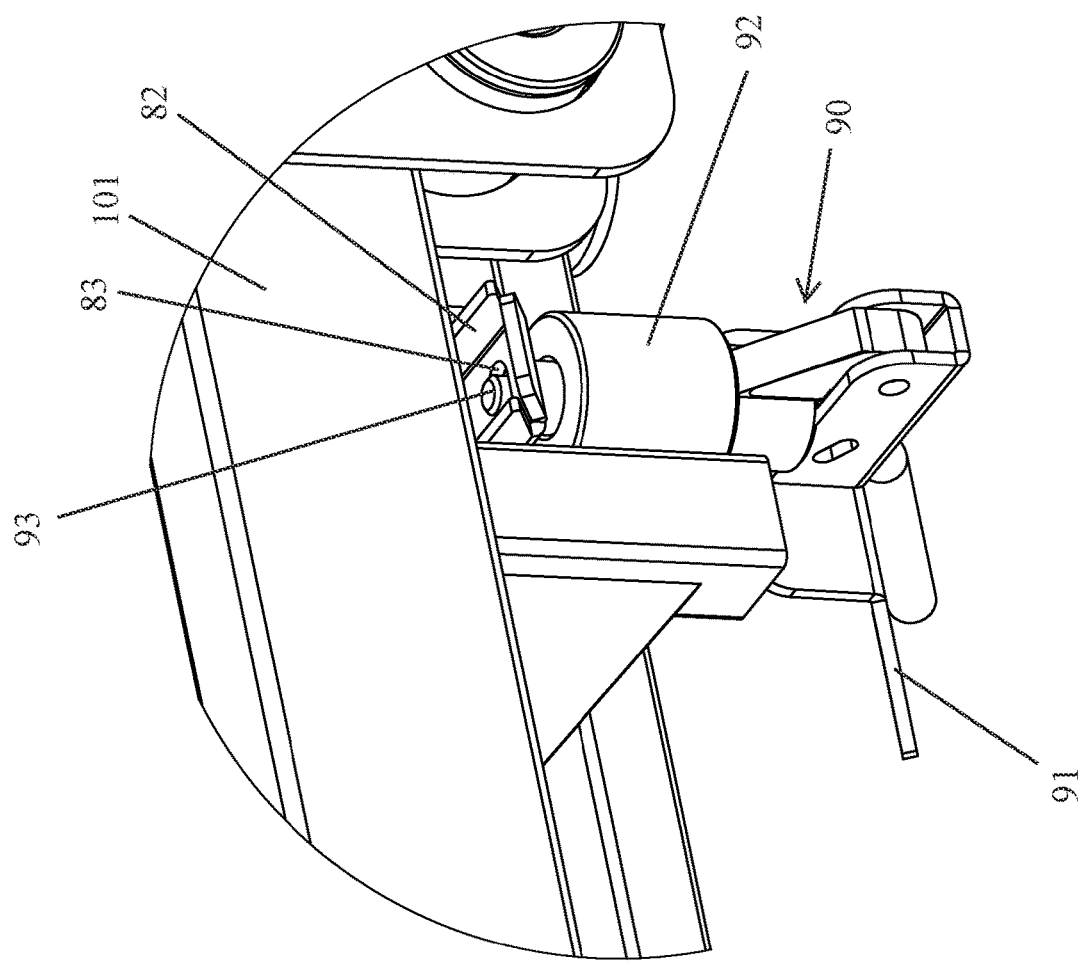
FIG. 17 is a locally enlarged perspective view of an armrest board positioning device of the medical rehabilitation chair in accordance with the preferred embodiment of the present invention.
Figure 18:
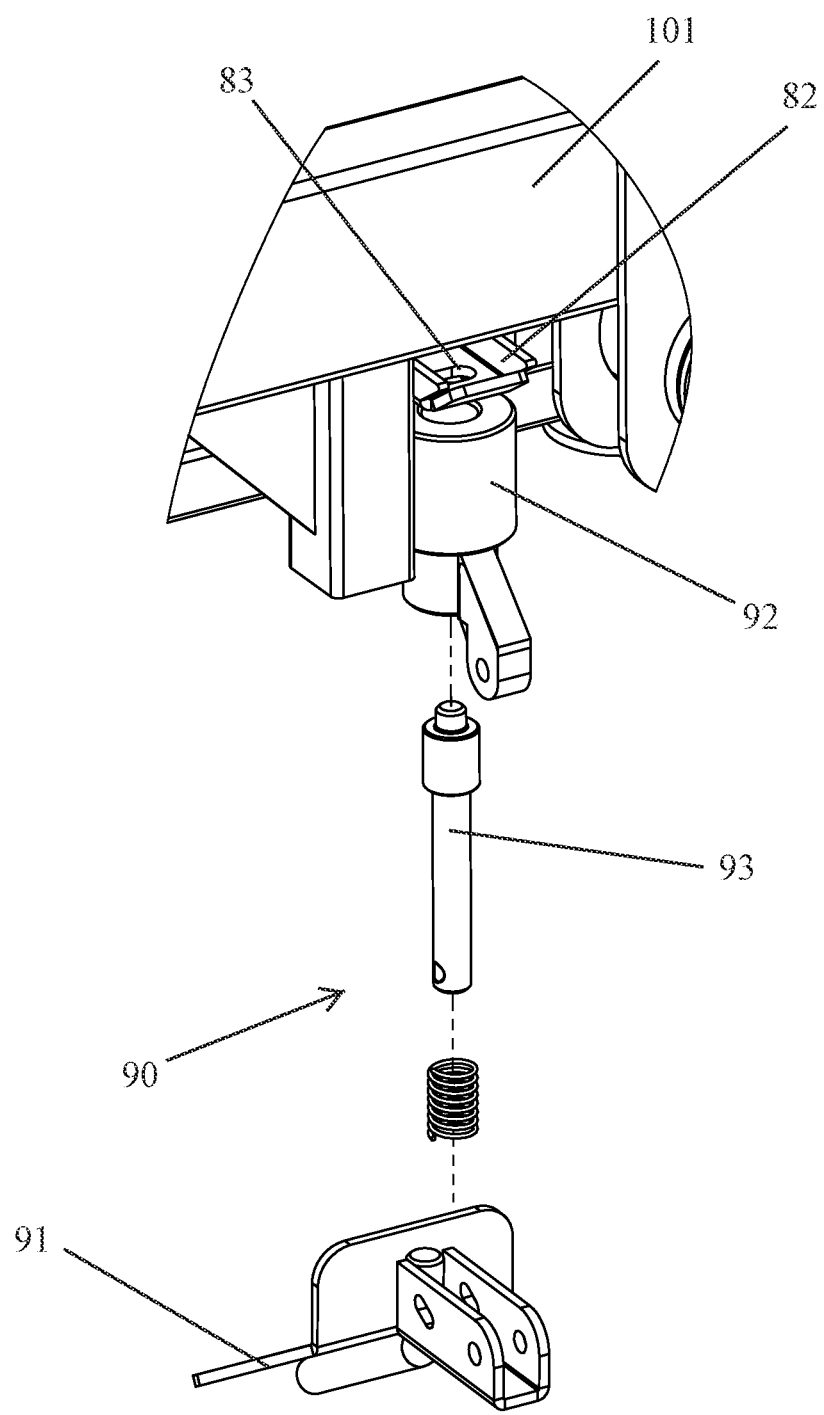
FIG. 18 is an exploded perspective view of the armrest board positioning device as shown in FIG. 17.

As shown in FIGS. 16-18, each of the two armrest boards 80 includes a hinge device 84 pivotally connected with one of the two side racks 101 of the main frame 10 so that each of the two armrest boards 80 is pivoted horizontally and outward. Thus, each of the two armrest boards 80 is opened. When each of the two armrest boards 80 is closed, the control board 91 of each of the two armrest board positioning devices 90 is stepped by the user, so that the positioning pin 93 is controlled and moved upward in the sliding tube 92 and inserted into the positioning hole 83 of the positioning member 82. Thus, the two armrest boards 80 are positioned to prevent the two armrest boards 80 from swinging sideward.

Figure 19:
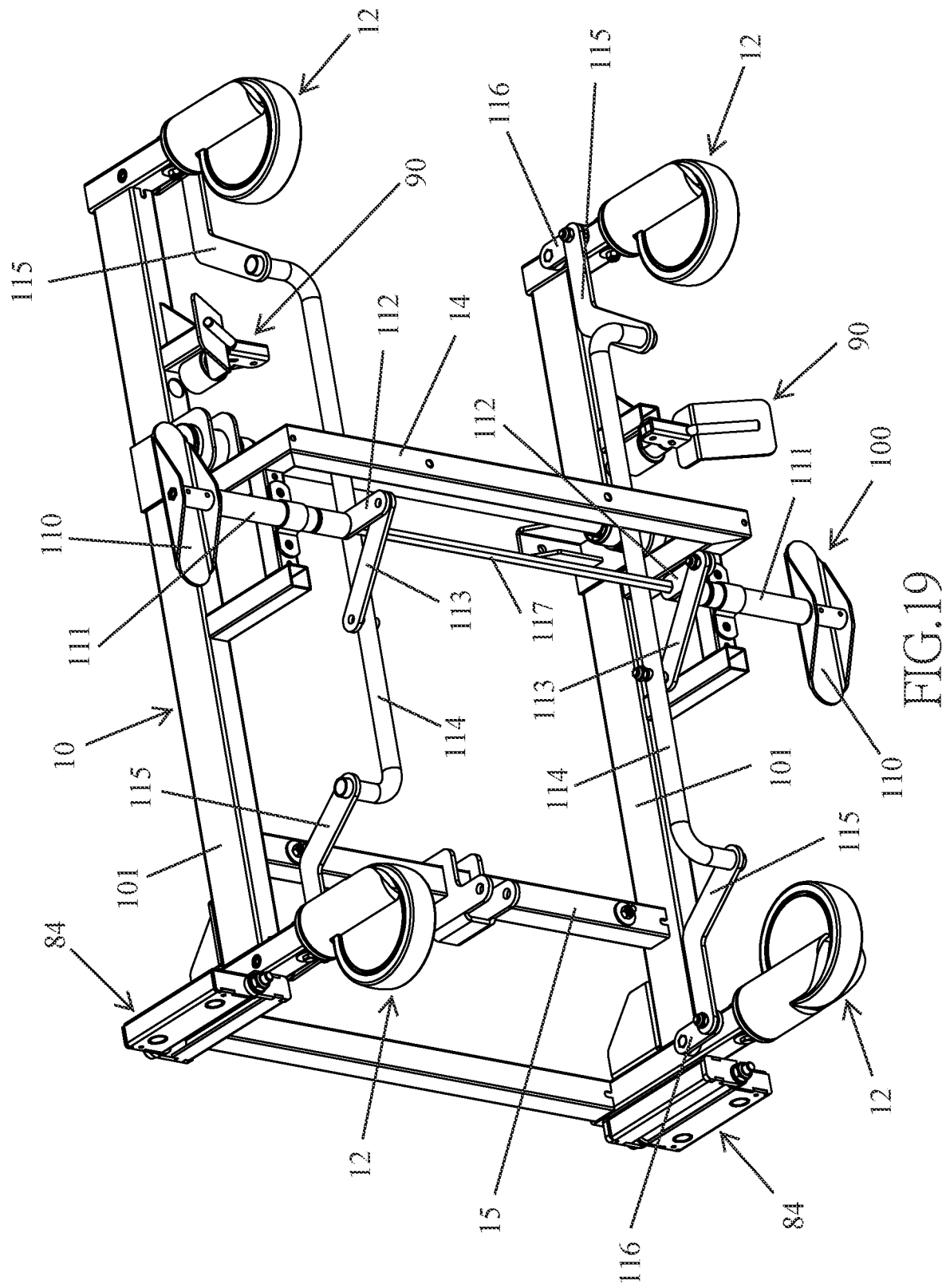
FIG. 19 is a partial bottom perspective view of the medical rehabilitation chair in accordance with the preferred embodiment of the present invention.

As shown in FIG. 19, when the swing pedal 110 of each of the two castor positioning devices 100 is treaded, the control crossbar 111 is rotated to move the fifth swinging lever 112 which moves the second driven lever 113 which moves the rocking bar 114 which moves the two third driven levers 115 which move the two fourth driven levers 116 which control and lock the castor devices 12 so that the castor devices 12 are locked and cannot be rotated. When the swing pedal 110 is treaded again, the castor devices 12 are unlocked and can be rotated freely. Finally, the linking bar 117 is connected between the two castor positioning devices 100 to simultaneously link and control rotation of four castor devices 12.

Figure 14:
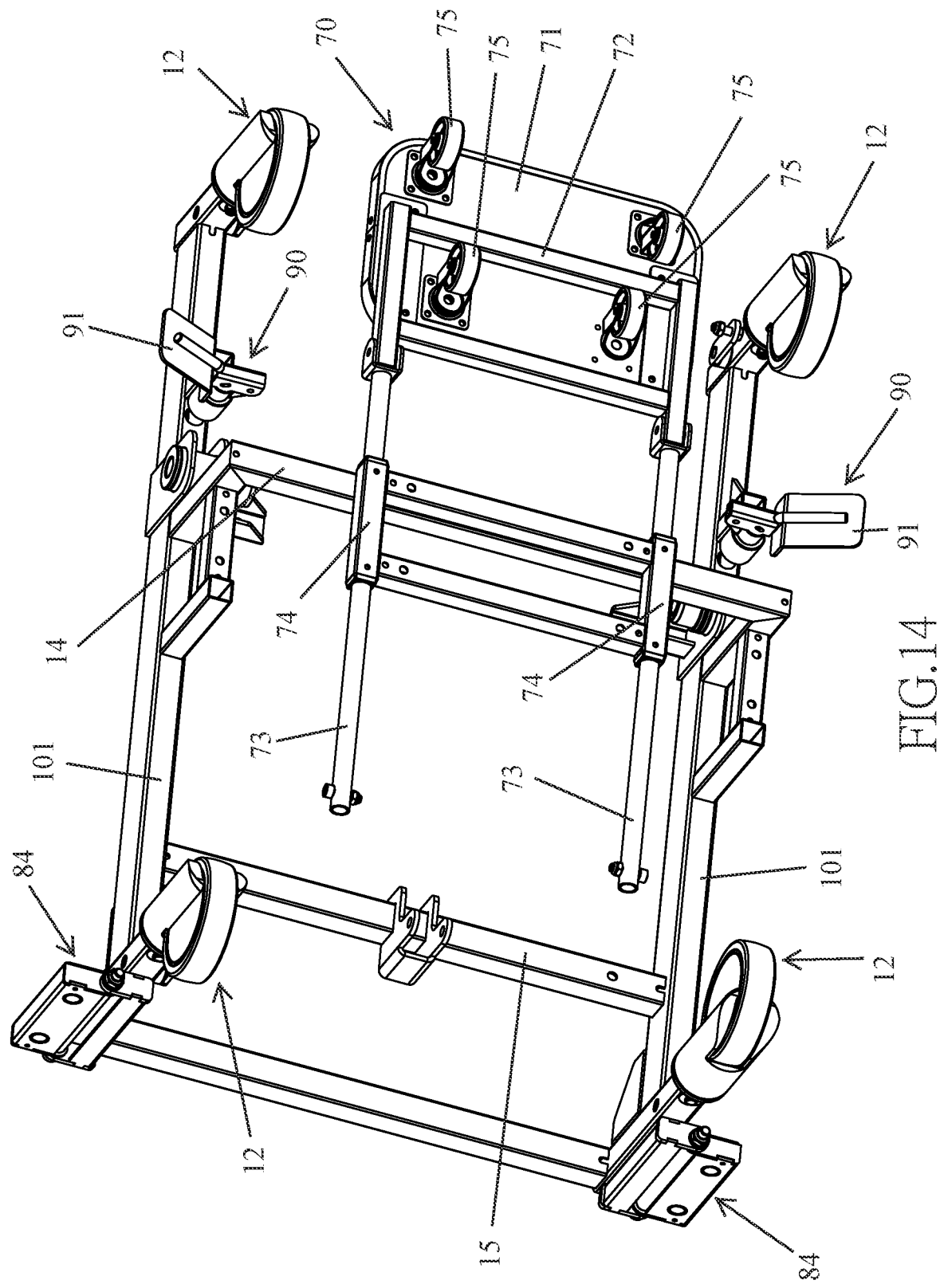
FIG. 14 is a partial bottom perspective view of the medical rehabilitation chair in accordance with the preferred embodiment of the present invention.
Figure 15:
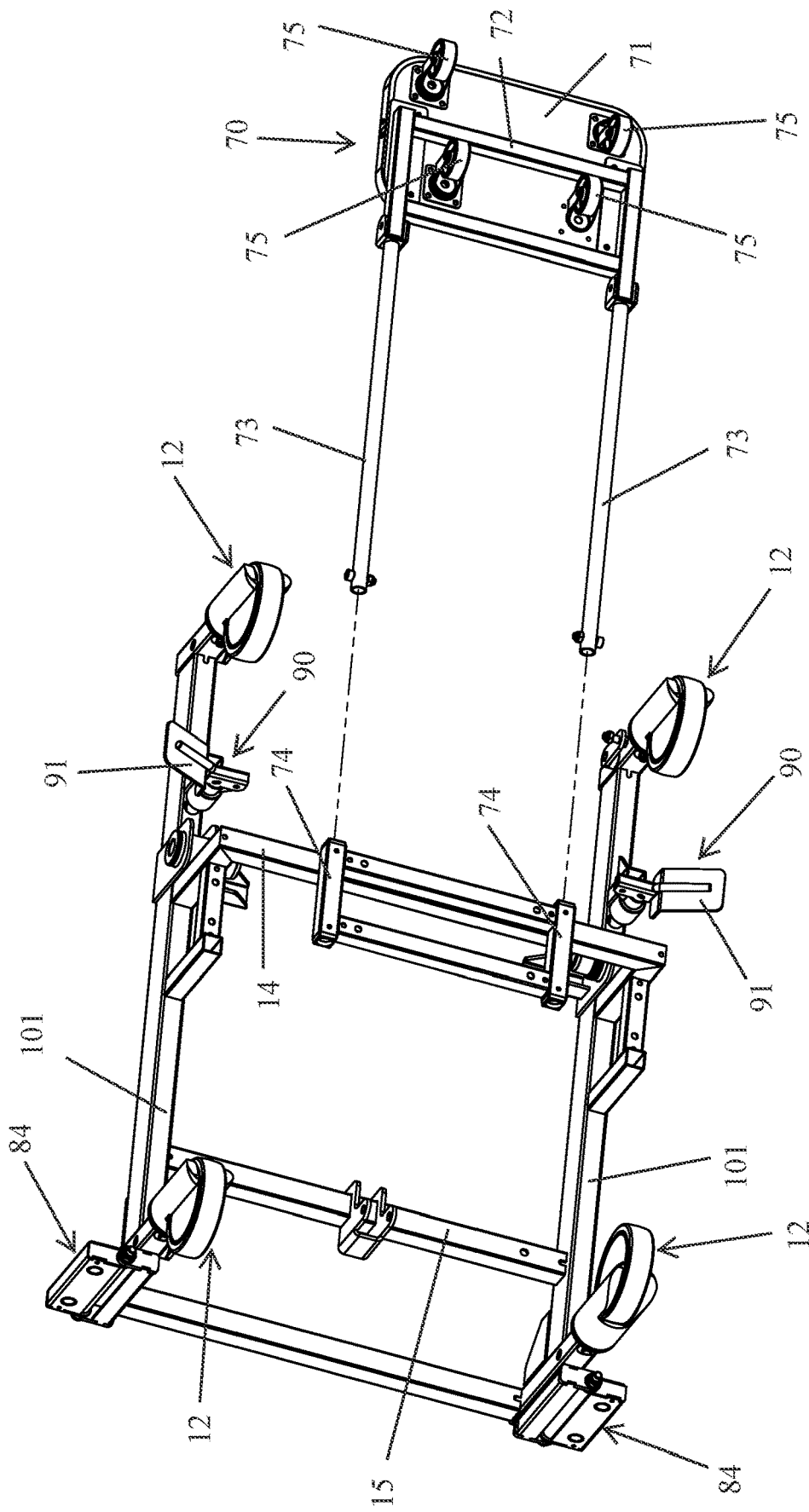
FIG. 15 is an exploded perspective view of the medical rehabilitation chair as shown in FIG. 14.

As shown in FIGS. 14 and 15, when the footrest 71 is pulled outward by the user, the at least one slide rod 73 slides outward from the at least one hollow mounting sleeve 74 so that the footrest 71 protrudes outward from the main frame 10. In addition, the footrest 71 is moved smoothly by provision of the rollers 75. When the foot support assembly 70 is not in use, the footrest 71 is pushed inward and disposed under the main frame 10.

Accordingly, the medical rehabilitation chair has the following advantages.

1. The medical rehabilitation chair includes a sitting mode, a lying mode, and a reclining mode. The reclining mode includes lifting and lowering operation.

When the user is disposed at the sitting state, the medical rehabilitation chair is disposed at a normal state. A vertical angle is defined between the seat frame assembly 30 (or the seat cushion 1) and the backrest frame assembly 40 (or the backrest cushion 2), and between the seat frame assembly 30 (or the seat cushion 1) and the two first swing members 51 (or the first leg support cushion 3) of the leg support assembly 50. In addition, the two driven members 52 (or the second leg support cushion) of the leg support assembly 50 are folded inward and disposed under the seat frame assembly 30 (or the seat cushion 1).

When the user is disposed at the lying state, the backrest frame assembly 40 (or the backrest cushion 2) is inclined backward, while the two first swing members 51 (or the first leg support cushion 3) and the two driven members 52 (or the second leg support cushion) of the leg support assembly 50 are expanded forward. In such a manner, the backrest frame assembly 40 (or the backrest cushion 2), the seat frame assembly 30 (or the seat cushion 1), the two first swing members 51 (or the first leg support cushion 3), and the two driven members 52 (or the second leg support cushion) are adjusted integrally to present a lying flat state.

Thus, the operation modes of the medical rehabilitation chair are adjusted quickly by an integral action of the telescopic damping driver 20, thereby facilitating the user manipulating the medical rehabilitation chair.

2. Each of the two armrest boards 80 is pivoted horizontally and outward to facilitate the user leaving laterally from the medical rehabilitation chair. When the two armrest boards 80 are closed, the two armrest boards 80 are respectively positioned by the two armrest board positioning devices 90. Thus, the two armrest boards 80 are positioned to prevent the two armrest boards 80 from freely swinging sideward, thereby assuring safety of use of the two armrest boards 80.

3. The placement board 81 is expanded upward and perpendicular to each of the two armrest boards 80 so that items or articles are placed on the placement board 81. Alternatively, the placement board 81 is folded downward and parallel with each of the two armrest boards 80 to save the space.

4. When one of the two castor positioning devices 100 is treaded, the four castor devices 12 are locked and cannot be rotated. When one of the two castor positioning devices 100 is treaded again, the four castor devices 12 are unlocked and cannot be rotated. Thus, when any one of the two castor positioning devices 100 is treaded, the four castor devices 12 are locked or unlocked synchronously.

5. The foot support assembly 70 is pulled outward from the main frame 10 to support the user's feet, thereby providing a comfortable sensation to the user.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A medical rehabilitation chair comprising:
   a main frame, a telescopic damping driver, a seat frame assembly, a backrest frame assembly, a leg support assembly, a lifting mechanism, a foot support assembly, two armrest boards, two armrest board positioning devices, and two castor positioning devices;

wherein:
   the main frame is placed on the ground;
   the main frame includes two side racks, two lifting guide plates, a main rotation rod, a first fixed bottom bracket, a second fixed bottom bracket, two first swinging levers, two first fixed members, two second fixed members, and two second swinging levers;
   the two side racks are parallel with each other;
   each of the two side racks has a front section and a rear section each provided with a castor device;
   each of the two lifting guide plates is secured to a mediate section of an inner side of one of the two side racks;
   each of the two lifting guide plates is formed with a first elongate slot and a second elongate slot;
   the main rotation rod is pivotally mounted between the two side racks;
   the first fixed bottom bracket is secured between the two side racks;
   the second fixed bottom bracket is secured between the two side racks;
   each of the two first swinging levers has a first end radially and pivotally connected with the main rotation rod;

each of the two first fixed members has a first end axially and pivotally connected with a second end of one of the two first swinging levers;
each of the two second fixed members has a first end securely connected with a second end of one of the two first fixed members;
each of the two second swinging levers has a first end pivotally connected with the second end of one of the two first fixed members;
the telescopic damping driver has a first end pivotally connected with the second fixed bottom bracket and a second end pivotally connected with the main rotation rod;
the telescopic damping driver drives and rotates the main rotation rod;
the seat frame assembly includes two seat frames, two first driven levers, two third swinging levers, two first linking members, and two second linking members;
the two seat frames are parallel with each other;
each of the two first driven levers has a front section pivotally connected with a mediate section of one of the two seat frames and a second end of one of the two second swinging levers of the main frame;
each of the two third swinging levers has a first end pivotally connected with a rear section of one of the two first driven levers;
each of the two third swinging levers has a second end pivotally connected with an inner side of one of the two lifting guide plates;
each of the two first linking members has a first end pivotally connected with a rear section of one of the two seat frames;
each of the two second linking members has a first end pivotally connected with a second end of one of the two first linking members;
each of the second linking members has a second end pivotally connected with an outer side of one of the two lifting guide plates;
the backrest frame assembly is pivotally connected with a rear section of the seat frame assembly;
different swinging angles are defined between the backrest frame assembly and the seat frame assembly;
the backrest frame assembly includes two connecting members, two fourth swinging levers, and two backrest frames;
each of the two connecting members has a first end pivotally connected with a rear section of one of the two seat frames;
each of the two fourth swinging levers has a first end pivotally connected with a second end of one of the two connecting members;
each of the two fourth swinging levers has a second end pivotally connected with the rear section of one of the two first driven levers of the seat frame assembly;
each of the two backrest frames is secured on a top of one of the two connecting members;
the leg support assembly is pivotally connected with a front section of the seat frame assembly;
different swinging angles are defined between the leg support assembly and the seat frame assembly;
the leg support assembly includes two first swing members, two driven members, and two second swing members;
each of the two first swing members is pivotally connected with a front section of one of the two seat frames and a second end of one of the two second fixed members of the main frame;
each of the two driven members has a first end pivotally connected with one of the two first swing members;
each of the two second swing members has a first end pivotally connected with the second end of one of the two second fixed members of the main frame;
each of the two second swing members has a second end pivotally connected with a second end of one of the two driven members;
the lifting mechanism includes two first outer swinging levers, two second outer swinging levers, two linking elements, and two springs;
each of the two first outer swinging levers has a first end pivotally connected with an upper edge of the outer side of one of the two lifting guide plates;
each of the two second outer swinging levers has a first end pivotally connected with a lower edge of the outer side of one of the two lifting guide plates;
each of the two second outer swinging levers has an inner side provided with two guide posts movably mounted in the first elongate slot and the second elongate slot of one of the two lifting guide plates;
each of the two linking elements has a mediate section pivotally connected with a second end of one of the two first outer swinging levers;
each of the two linking elements has a front section pivotally connected with one of the two second swinging levers of the main frame;
each of the two linking elements has a rear section pivotally connected with a second end of one of the two second outer swinging levers;
each of the two linking elements is pivotally connected with one of the two first linking members of the seat frame assembly;
each of the two springs has a first end secured to a mediate section of one of the two first outer swinging levers and a second end secured to a lower edge of one of the two lifting guide plates;
the foot support assembly is mounted on a bottom of the main frame;
the foot support assembly is movable in a horizontal direction to protrude from a front section of the main frame;
the two armrest boards are mounted on two opposite sides of the main frame;
each of the two armrest boards has an end pivotally connected with one of the two side racks of the main frame so that each of the two armrest boards is pivoted horizontally and outward;
each of the two armrest board positioning devices is mounted on one of the two side racks to position one of the two armrest boards; and
the two castor positioning devices are mounted on two ends of the first fixed bottom bracket of the main frame and located under the two side racks to link and rotate the castor devices of the two side racks respectively.

2. The medical rehabilitation chair as claimed in claim 1, wherein the main rotation rod is radially provided with two pivot ears, and each of the two pivot ears is pivotally connected with the first end of one of the two first swinging levers.

3. The medical rehabilitation chair as claimed in claim 1, wherein:
the telescopic damping driver includes a telescopically arranged cylinder unit and a motor device connecting and driving the cylinder unit;
the motor device is pivotally connected with the second fixed bottom bracket; and the telescopically arranged cylinder unit has an end pivotally connected with the main rotation rod to drive and rotate the main rotation rod.

4. The medical rehabilitation chair as claimed in claim 1, wherein:

the foot support assembly includes a footrest, a bottom rack, at least one slide rod, at least one hollow mounting sleeve, and multiple rollers;

the bottom rack and the rollers are mounted on a bottom of the footrest;

the at least one slide rod is secured on a side of the bottom rack;

the at least one hollow mounting sleeve is secured to the first fixed bottom bracket; and the at least one slide rod extends through and slides forward and backward in the at least one hollow mounting sleeve.

5. The medical rehabilitation chair as claimed in claim 1, wherein each of the two armrest boards includes a hinge device pivotally connected with one of the two side racks.

6. The medical rehabilitation chair as claimed in claim 1, wherein:

each of the two armrest boards has an outer side pivotally connected with a placement board; and the placement board is folded downward and parallel with each of the two armrest boards or expanded upward and perpendicular to each of the two armrest boards.

7. The medical rehabilitation chair as claimed in claim 1, wherein:

each of the two armrest boards has an inner side provided with a positioning member defining a positioning hole;

each of the two armrest board positioning devices includes a control board, a hollow sliding tube, and a positioning pin;

the positioning pin is mounted in the sliding tube; and the control board is connected with the positioning pin and controls upward and downward movement of the positioning pin, so that the positioning pin is moved upward and inserted into the positioning hole of the positioning member.

8. The medical rehabilitation chair as claimed in claim 1, wherein:

each of the two castor positioning devices includes:

a swing pedal;

a control crossbar having a first end axially and securely connected with the swing pedal;

a fifth swinging lever having a first end securely connected with a second end of the control crossbar;

a second driven lever having a first end pivotally connected with a second end of the fifth swinging lever;

a rocking bar pivotally connected with a second end of the second driven lever and having two ends;

two third driven levers each having a first end pivotally connected with one of the two ends of the rocking bar; and two fourth driven levers each having a first end pivotally connected with a second end of one of the two third driven levers; and each of the two fourth driven levers has a second end controlling rotation of one of the castor devices of each of the two side racks.

9. The medical rehabilitation chair as claimed in claim 1, wherein a linking bar is connected between the two castor positioning devices to simultaneously link and control rotation of the castor devices of the two side racks.

10. The medical rehabilitation chair as claimed in claim 1, further comprising:

a seat cushion secured on the two seat frames.

11. The medical rehabilitation chair as claimed in claim 1, further comprising:

a backrest cushion secured on the two backrest frames.

12. The medical rehabilitation chair as claimed in claim 1, further comprising:

a first leg support cushion secured on the two first swing members.

* * * * *